United States Patent
Tanimura et al.

(10) Patent No.: US 8,515,277 B2
(45) Date of Patent: Aug. 20, 2013

(54) NONLINEAR DISTORTION DETECTING CIRCUIT, OPTICAL RECEIVER, OPTICAL TRANSMISSION SYSTEM, AND METHOD FOR DETECTING NONLINEAR DISTORTION

(75) Inventors: Takahito Tanimura, Kawasaki (JP); Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 12/910,955

(22) Filed: Oct. 25, 2010

(65) Prior Publication Data
US 2011/0097075 A1    Apr. 28, 2011

(30) Foreign Application Priority Data
Oct. 26, 2009    (JP) ................. 2009-245179

(51) Int. Cl.
*H04B 10/08*    (2006.01)
(52) U.S. Cl.
USPC ..................... 398/25; 398/26; 398/29
(58) Field of Classification Search
USPC ............... 398/25–29, 148–149, 159
See application file for complete search history.

(56) References Cited

U.S. PATENT DOCUMENTS

| | | | |
|---|---|---|---|
| 2007/0098090 A1* | 5/2007 | Ma et al. | 375/260 |
| 2008/0279565 A1* | 11/2008 | Shu | 398/158 |
| 2009/0175629 A1* | 7/2009 | Liu et al. | 398/147 |
| 2010/0054759 A1* | 3/2010 | Oda et al. | 398/202 |
| 2010/0247099 A1* | 9/2010 | Lowery et al. | 398/79 |

OTHER PUBLICATIONS

Kazuro, Kikuchi "Electronic Post-compensation for Nonlinear Phase Fluctuations in a 1000-km 20-Gbit/s Optical Quadrature Phase-shift Keying Transmission System Using the Digital Coherent Receiver", Optics Express, vol. 16, No. 2, Jan. 9, 2008, pp. 889-896.

* cited by examiner

*Primary Examiner* — Dzung Tran
(74) *Attorney, Agent, or Firm* — Fujitsu Patent Center

(57) ABSTRACT

An apparatus includes a first estimator that estimates a signal quality based on an error correction number of an electrical signal obtained by photoelectrically converting a received optical signal; a second estimator that estimates a signal quality from which the influence of nonlinear effects is removed based on signals upstream and downstream of an identification calculator identifying the electrical signal; and a calculator that calculates the difference between the signal qualities estimated by the first and second estimators to calculate the amount of nonlinear effects.

8 Claims, 11 Drawing Sheets

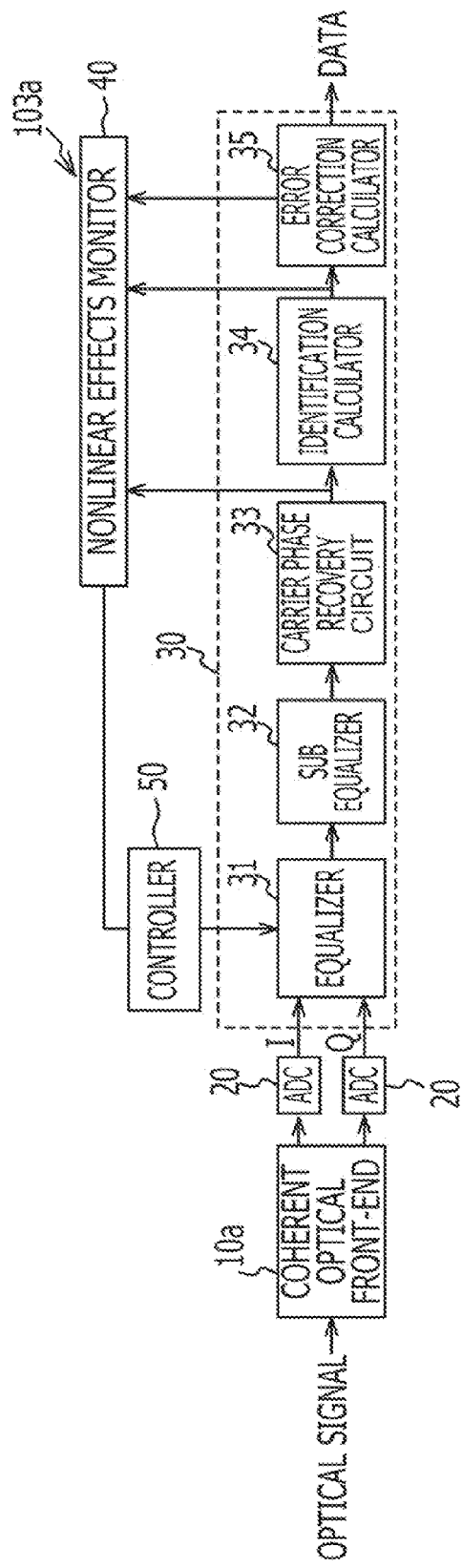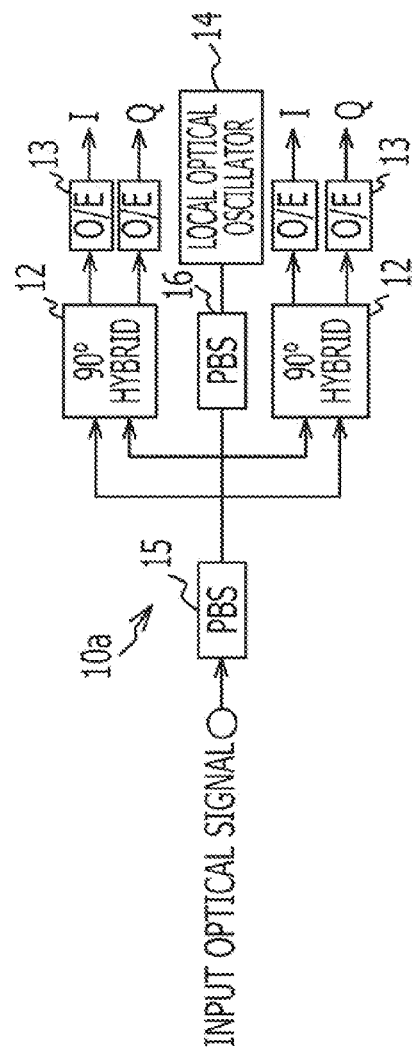
FIG. 9A
FIG. 9B

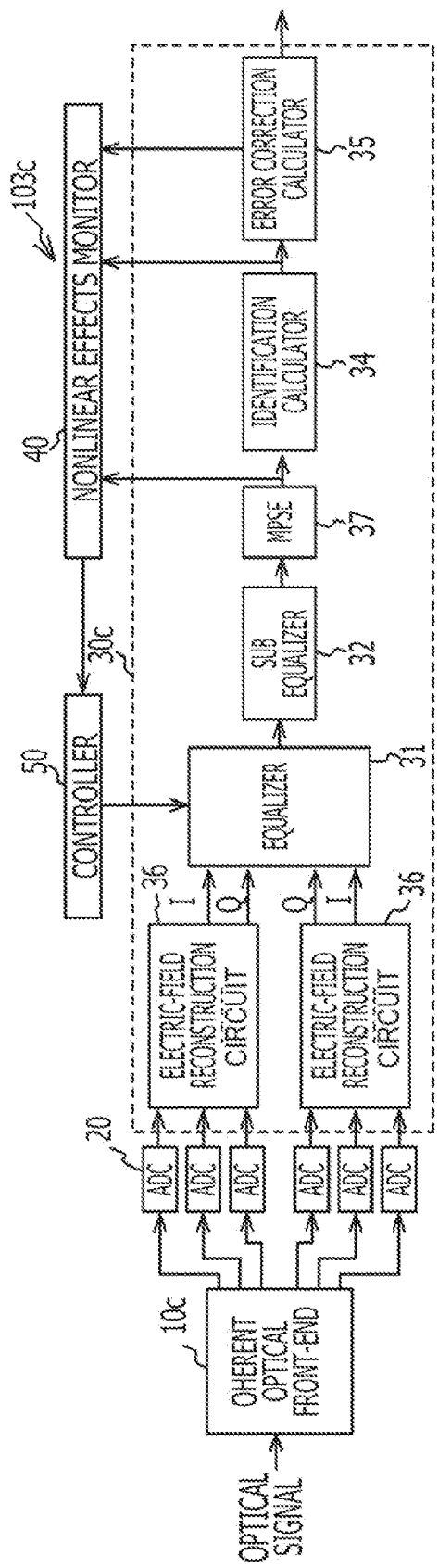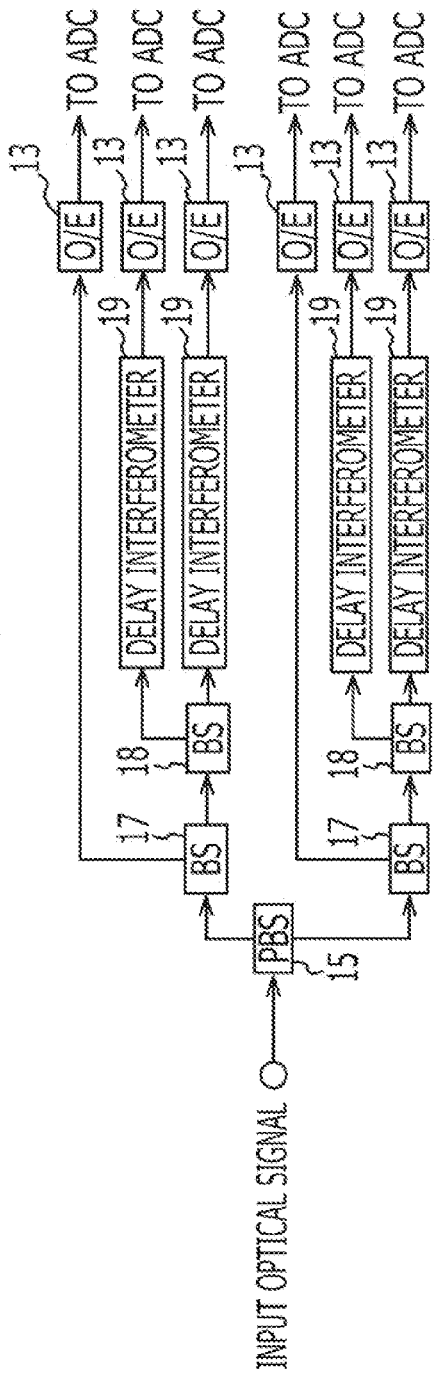

NONLINEAR DISTORTION DETECTING CIRCUIT, OPTICAL RECEIVER, OPTICAL TRANSMISSION SYSTEM, AND METHOD FOR DETECTING NONLINEAR DISTORTION

CROSS REFERENCE TO RELATED APPLICATION

This application is based upon and claims the benefit of priority of the prior Japanese Patent Application No. 2009-245179, filed on Oct. 26, 2009, the entire contents of which are incorporated herein by reference.

FIELD

The embodiments relate to a nonlinear distortion detecting module, an optical receiver, an optical transmission system, and a method for detecting nonlinear distortion.

BACKGROUND

In communication networks, optical communication using optical fibers as transmission path segments is often used. To cope with a recent increase in the amount of information streaming through a network, increasing the transmission distance and transmission capacity of an optical transmission system is required. However, the transmission distance and transmission capacity of the optical transmission system are limited due to optical waveform distortions in optical fibers. The optical waveform distortions include linear distortion and nonlinear distortion.

The linear distortion includes, for example, chromatic dispersion and polarization mode dispersion. The linear distortion can be compensated for using a digital coherent technique and an equalizing technique based on digital signal processing, or using an optical compensating technique in an optical receiving device receiving an optical signal transmitted through optical fibers. The nonlinear distortion includes, for example, cross-phase modulation and self-phase modulation. Compensation for the nonlinear distortion in an optical receiving device is disclosed in, for example, Kazuro Kikuchi, "Electronic Post-compensation for Nonlinear Phase Fluctuations in a 1000-km 20-Gbit/s Optical Quadrature Phase-shift Keying Transmission System Using the Digital Coherent Receiver", OPTICS EXPRESS, Vol. 16, No. 2, pp. 889-896, 2008.

According to the disclosed technique, nonlinear distortion caused in optical fibers can be compensated for in an optical receiving device. However, the above-described technique does not detect nonlinear distortion. Accordingly, the accuracy with which to compensate for nonlinear distortion is limited.

SUMMARY

According to an aspect of the invention, an apparatus includes a first estimator that estimates a signal quality based on an error correction number of an electrical signal obtained by photoelectrically converting a received optical signal; a second estimator that estimates a signal quality from which the influence of nonlinear effects is removed based on signals upstream and downstream of an identification calculator identifying the electrical signal; and a calculator that calculates the difference between the signal qualities estimated by the first and second estimators to calculate the amount of nonlinear effects.

The object and advantages of the invention will be realized and attained by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9A illustrates an optical receiver according to a second embodiment.
FIG. 9B illustrates a coherent optical front-end.
FIG. 11A illustrates an optical receiver according to a fourth embodiment.
FIG. 11B illustrates a coherent optical front-end.

DESCRIPTION OF EMBODIMENTS

Embodiments will be described below with reference to the drawings.

First Embodiment

Figure 1:
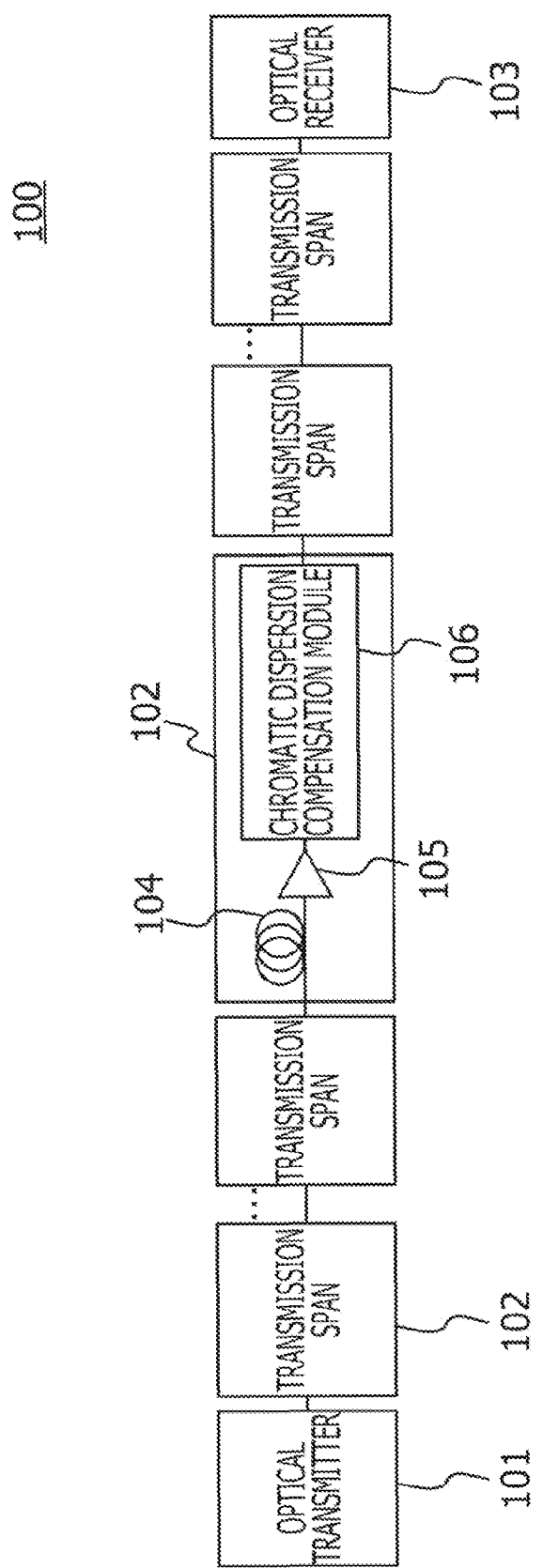
FIG. 1 illustrates an optical transmission system.

FIG. 1 illustrates an optical transmission system 100. Referring to FIG. 1, the optical transmission system 100 includes an optical transmitter 101, an optical transmission path including a plurality of concatenated transmission spans 102, and an optical receiver 103. The optical transmitter 101 outputs an optical signal modulated based on an electrical signal to the optical transmission path. The transmission span 102 at the first stage receives the optical signal from the optical transmitter 101. This optical signal travels through the transmission spans 102 at multiple stages. The transmission span 102 at the last stage transmits the optical signal to the optical receiver 103. The optical receiver 103 converts the optical signal to an electrical signal and outputs the electrical signal.

Each transmission span 102 includes a transmission path segment 104, an optical amplifier 105, and a chromatic dispersion compensation module 106. The transmission path segment 104 is, for example, an optical fiber. The optical amplifier 105 is, for example, a rare earth added optical fiber amplifier or a Raman amplifier and amplifies an optical signal attenuated in the transmission path segment 104. The chromatic dispersion compensation module 106 compensates for chromatic dispersion caused in the transmission path segment 104.

Figure 2A:
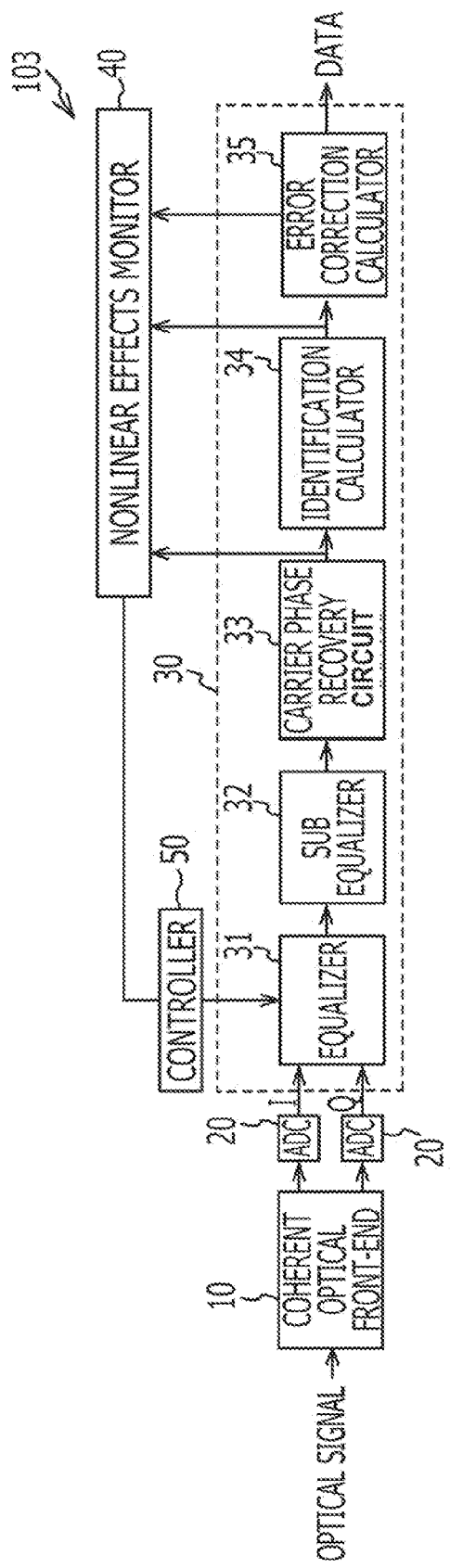
FIG. 2A illustrates an optical receiver.
Figure 2B:
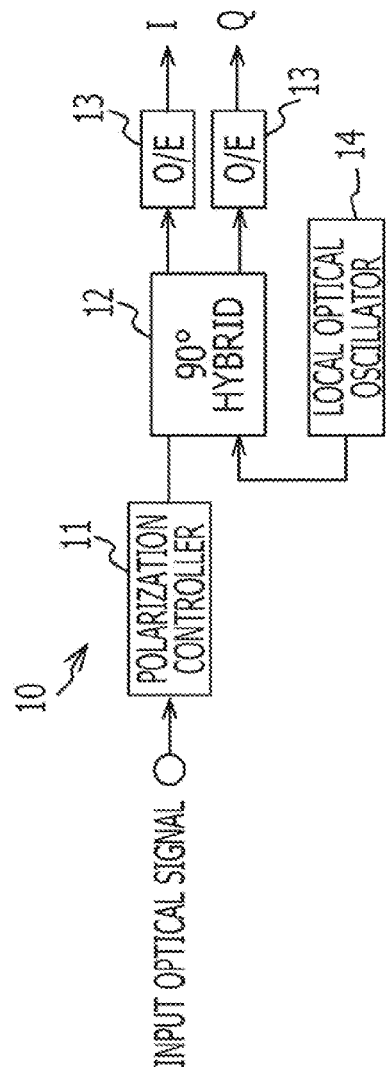
FIG. 2B illustrates a coherent optical front-end.

FIGS. 2A and 2B illustrate the optical receiver 103. Referring to FIG. 2A, the optical receiver 103 includes a coherent optical front-end 10, analog-to-digital converters (ADCs) 20, a main signal processor 30, a nonlinear effects monitor 40, and a controller 50.

Referring to FIG. 2B, the coherent optical front-end 10 is the integration of optical and electronic components and includes a polarization controller 11, a 90° hybrid 12, two optical-to-electrical converters (O/Es) 13, and a local optical oscillator 14.

An optical signal received by the optical receiver 103 is input to the polarization controller 11. An optical signal modulating method applicable to the present embodiment is not particularly limited. The optical signal is, for example, a multi-phase shift keying (mPSK) signal. The polarization controller 11 outputs an optical signal polarized in a desired direction based on the input optical signal. The 90° hybrid 12 demodulates the optical signal based on an oscillation signal from the local optical oscillator 14 and outputs an I-phase signal and a Q-phase signal which are 90 degrees out of phase with each other.

One of the O/Es 13 converts the I-phase signal to an electrical signal and outputs the resultant signal to one of the ADCs 20. The other O/E 13 converts the Q-phase signal to an electrical signal and outputs the resultant signal to the other ADC 20. Each ADC 20 converts the received electrical signal in analog form to a digital electrical signal. The resultant I-phase and Q-phase signals, serving as the digital electrical signals, are input to the main signal processor 30.

The main signal processor 30 includes an equalizer 31, a sub equalizer 32, a carrier phase recovery circuit 33, an identification calculator 34, and an error correction calculator 35. The equalizer 31 compensates for linear distortion and nonlinear distortion.

Figure 3:
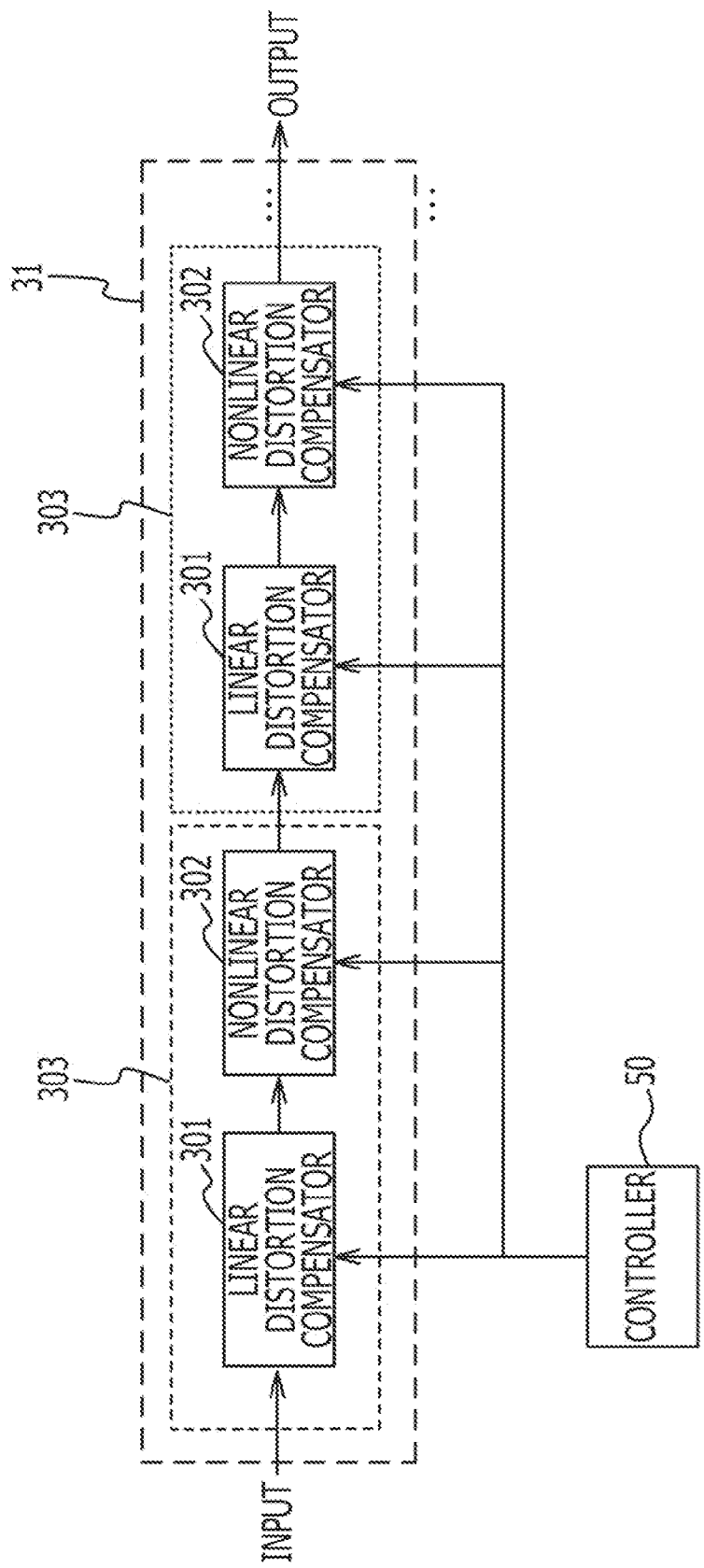
FIG. 3 illustrates an exemplary configuration of an equalizer.

FIG. 3 illustrates an exemplary configuration of the equalizer 31. Referring to FIG. 3, the equalizer 31 includes a plurality of linear distortion compensators 301 and a plurality of nonlinear distortion compensators 302. One linear distortion compensator 301 is paired with one nonlinear distortion compensator 302, thus providing one distortion compensator 303. Either of the linear distortion compensator 301 and the nonlinear distortion compensator 302 may be located at the front stage or back stage of the distortion compensator 303. The equalizer 31 includes a plurality of distortion compensators 303 connected in series. In the equalizer 31, therefore, the linear distortion compensators 301 and the nonlinear distortion compensators 302 are alternately arranged. Consequently, the equalizer 31 alternately performs linear distortion compensation and nonlinear distortion compensation on input signals and outputs the distortion-compensated signals.

The sub equalizer 32 compensates for small distortion that is not compensated for by the equalizer 31 and transmits the distortion-compensated signals to the carrier phase recovery circuit 33. The carrier phase recovery circuit 33 detects a phase shift between the received signals to recover a signal and transmits the signal to the identification calculator 34. The identification calculator 34 compares the received signal from the carrier phase recovery circuit 33 with a threshold value in order to identify a signal for each symbol. The error correction calculator 35 compares a redundant portion which can be determined when an error occurs with actual data. If an error occurs, the error correction calculator 35 corrects the error.

The following is the quotation for explanation of "symbol" from WikipediA on the Internet. Any digital modulation scheme uses a finite number of distinct signals to represent digital data. PSK uses a finite number of phases, each assigned a unique pattern of binary digits. Usually, each phase encodes an equal number of bits. Each pattern of bits forms the symbol that is represented by the particular phase.

The nonlinear effects monitor 40 detects nonlinear distortion of an optical signal received by the optical receiver 103. The nonlinear effects monitor 40 will be described in detail later. The controller 50 controls the linear distortion compensators 301 and the nonlinear distortion compensators 302 in the equalizer 31 based on nonlinear distortion detected by the nonlinear effects monitor 40 to compensate for the nonlinear distortion.

The main signal processor 30 may include, for example, an application specific integrated circuit (ASIC) which is an integrated circuit (IC). This ASIC may include at least either of the ADCs 20, the nonlinear effects monitor 40, and the controller 50. Instead of the ASIC, for example, a field programmable gate array (FPGA) or a digital signal processor (DSP) may be used. Alternatively, the main signal processor 30 may include the ASIC, the FPGA, and the DSP in combination.

Figure 4:
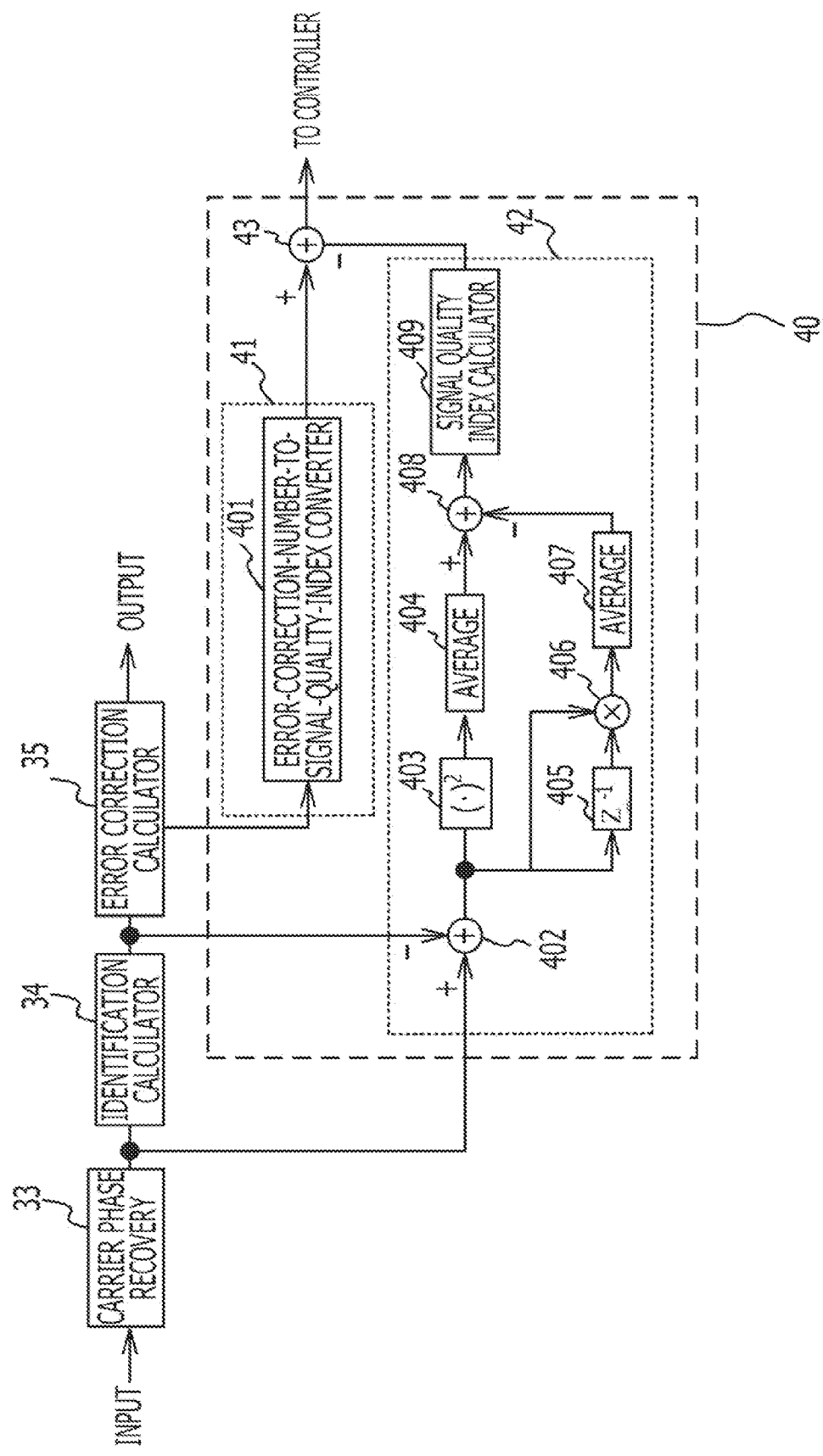
FIG. 4 illustrates a nonlinear effects monitor.

The nonlinear effects monitor 40 will be described in detail below. FIG. 4 illustrates the nonlinear effects monitor 40. Referring to FIG. 4, the nonlinear effects monitor 40 includes a first estimator 41, a second estimator 42, and an adder 43. The first estimator 41 includes an error-correction-number-to-signal-quality-index converter 401. The second estimator 42 includes adders 402 and 408, a squarer 403, averagers 404 and 407, a delayer 405, a multiplier 406, and a signal quality index calculator 409.

The adder 402 receives signals from the carrier phase recovery circuit 33 and the identification calculator 34.

The I-phase signal and the Q-phase signal supplied to the carrier phase recovery circuit 33 can be expressed using a scalar (ranging from 0 to $2\pi$) of the phase expressed by the following expression.

$$d_k+\theta_k+n_k+\delta_k \quad (1)$$

Where $d_k$: modulated data of the kth symbol (for example, a quadrature value (0° to 270°));

$\theta_k$: phase noise and offset of the kth symbol;

$n_k$: white Gaussian noise of the kth symbol; and $\delta_k$: nonlinear noise of the kth symbol.

The carrier phase recovery circuit 33 outputs a signal obtained by subtracting a phase angle estimated by signal processing from Expression (1). Specifically, the estimated phase angle is defined as $\theta_k^{(est)}$.

In addition, $\theta_k - \theta_k^{(est)} = \Delta\theta_k$. In this case, an output signal of the carrier phase recovery circuit 33 can be expressed by the following expression.

$$d_k+\Delta\theta_k+n_k+\delta_k \quad (2)$$

The identification calculator 34 outputs the modulated data $d_k$. The adder 402 outputs a signal obtained by subtracting an output value of the identification calculator 34 from an output value of the carrier phase recovery circuit 33. Therefore, the output signal of the adder 402 can be expressed by the following expression.

$$\Delta\theta_k+n_k+\delta_k \quad (3)$$

The squarer 403 squares an output value of the adder 402 and outputs the resultant signal to the averager 404.

The output signal of the squarer 403 can be expressed by the following expression.

$$\Delta\theta_k^2 + n_k^2 + \delta_k^2 + 2\Delta\theta_k n_k + 2n_k\delta_k + 2\Delta\theta_k\delta_k \quad (4)$$

The averager 404 outputs the average of output signals of the squarer 403 as a signal S1 to the adder 408. The white Gaussian noise $n_k$ has no correlation between symbols. Accordingly, when an average for a plurality of symbols is calculated, $2\Delta\theta_k n_k$ and $2n_k\delta_k$ in Expression (4) can be regarded as zero. In addition, the nonlinear noise $\delta_k$ is random. When an average for a plurality of symbols is calculated, therefore, $2\Delta\theta_k\delta_k$ in Expression (4) can also be regarded as zero.

The delayer 405 delays the output signal of the adder 402 by one symbol and outputs the resultant signal. The multiplier 406 outputs the product of the output signal of the adder 402 and that of the delayer 405 to the averager 407. An output signal of the multiplier 406 can be expressed by the following expression.

$$\Delta\theta_k\Delta\theta_{k+1} + n_k n_{k+1} + \delta_k\delta_{k+1} + \Delta\theta_k n_{k+1} + \Delta\theta_{k+1} n_k + n_k\delta_{k+1} + n_{k+1}\delta_k + \Delta\theta_k\delta_{k+1} + \Delta\theta_{k+1}\delta_k \quad (5)$$

The averager 407 outputs the average of output signals of the multiplier 406 as a signal S2 to the adder 408. The white Gaussian noise $n_k$ has no correlation between symbols as described above. Accordingly, when an average for a plurality of symbols is calculated, $n_k n_{k+1}$, $\Delta\theta_k n_{k+1}$, $n_k\delta_{k+1}$, and $n_{k+1}\delta_k$ can be regarded as zero. In addition, the nonlinear noise $\delta_k$ is also random. Accordingly, when an average for a plurality of symbols is calculated, $\Delta\theta_k\Delta\theta_{k+1}$ and $\Delta\theta_{k+1}\delta_k$ in Expression (5) can also be regarded as zero so long as it is approximated that $\Delta\theta_k = \Delta\theta_{k+1}$. The nonlinear noise $\delta_k$ is random but has a correlation between symbols. Therefore, if an average for symbols is calculated, $\delta_k\delta_{k+1}$ in Expression (5) is not zero in some cases. Consequently, an output signal of the adder 408, which outputs a signal obtained by subtracting the signal S2 from the signal S1, can be expressed by the following expression.

$$S1 - S2 = \text{average}(n_k^2 + \delta_k^2 - \delta_k\delta_{k+1}) \quad (6)$$

A bit error rate (BER) is calculated from an intra-frame error correction number. The BER can be converted to a phase angle spread average$(n_k^2 + \delta_k^2)$ caused by noise. The phase angle spread caused by noise is subtracted from Expression (6), thus obtaining average$(\delta_k\delta_{k+1})$. Assuming that $\delta_{k+1} = \delta_k + \Delta_k$ and average$(\Delta_k) = 0$, average$(\delta_k\delta_{k+1}) = $ average $(\delta_k(\delta_k + \Delta_k)) = $ average$(\delta_k^2 + \delta_k\Delta_k) = $ average $(\delta_k^2)$. Therefore, an amount proportional to the magnitude of nonlinear effects (hereinafter, called "nonlinear effects monitor amount") can be detected. As described above, a nonlinear effects monitor amount can be separated using the fact that white Gaussian noise has no correlation between symbols and nonlinear noise has a correlation between symbols.

In the present embodiment, a Q value is used as a signal quality index. Specifically, the error-correction-number-to-signal-quality-index converter 401 converts a BER to a Q value. The Q value can be expressed as $\sqrt{2}\text{erfc}^{-1}(2 \times \text{BER})$. The signal quality index calculator 409 calculates a signal quality index (Q value) based on the output of the adder 408. In this case, the Q value can be expressed as $Q = (1/2) \times 1/(S1 - S2)$. The adder 43 subtracts the Q value obtained by the error-correction-number-to-signal-quality-index converter 401 from the Q value obtained by the signal quality index calculator 409. Thus, an amount proportional to the magnitude of nonlinear effects can be detected.

In this embodiment, a nonlinear effects monitor amount can be acquired using signals upstream and downstream of the identification calculator 34 and an error correction number. Accordingly, a nonlinear effects monitor amount can be acquired using a main signal processor of an existing optical receiver.

The result of output of the adder 43 is supplied to the controller 50. The controller 50 controls the equalizer 31 so that the nonlinear effects monitor amount detected by the nonlinear effects monitor 40 decreases. Consequently, nonlinear distortion can be compensated for with high accuracy. In addition, when the controller 50 controls the equalizer 31 so as to minimize the nonlinear effects monitor amount detected by the nonlinear effects monitor 40, the nonlinear distortion can be maximally compensated for.

To increase the accuracy, the error-correction-number-to-signal-quality-index converter 401 may perform integration until an error correction number n exceeds a threshold value N. In this case, preferably, the averagers 404 and 407 each output an average up to the extent that the error correction number n exceeds the threshold value N.

Figure 5:
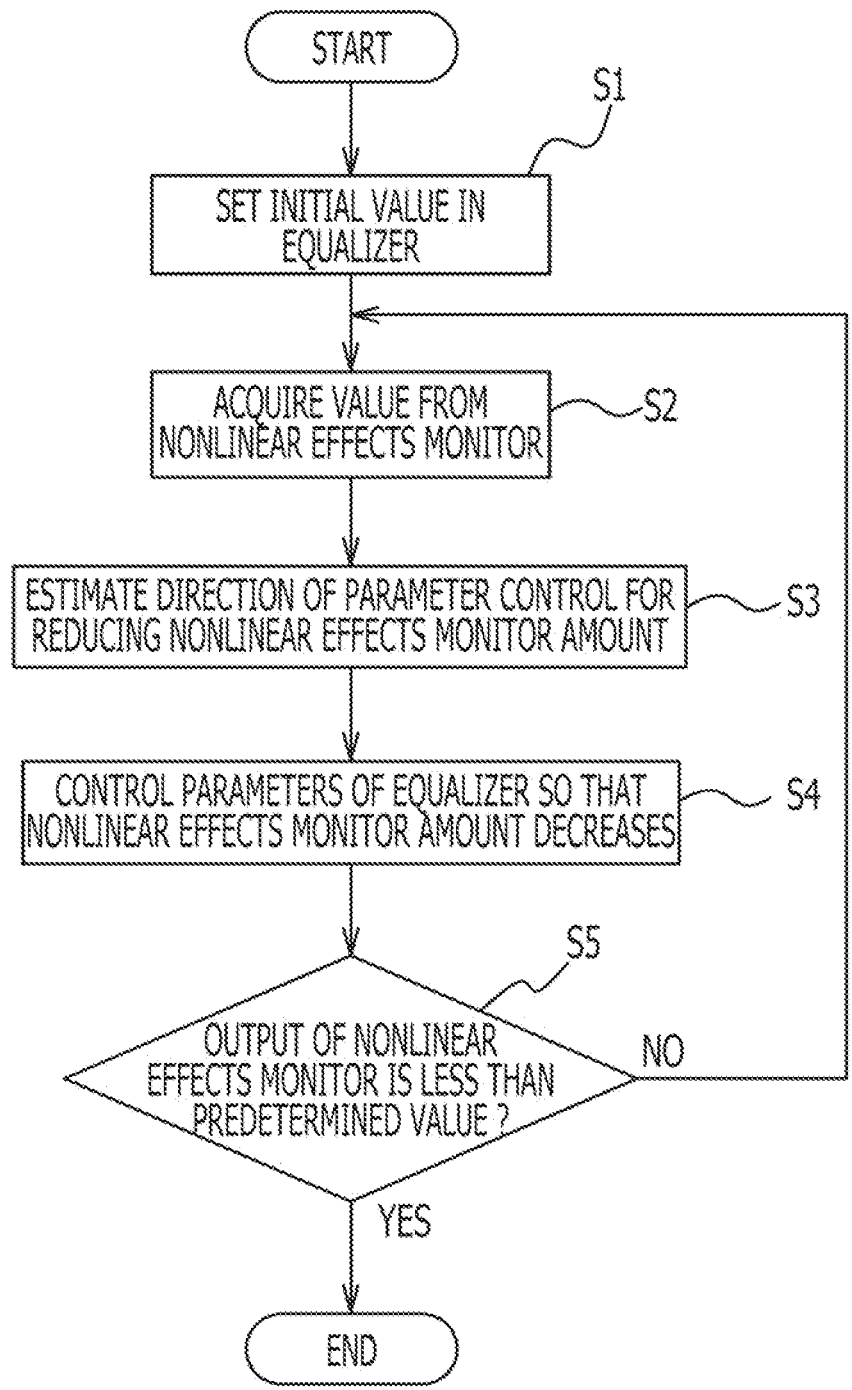
FIG. 5 illustrates a control method performed by a controller.

FIG. 5 illustrates a control method performed by the controller 50. Referring to FIG. 5, the controller 50 sets an initial value in the equalizer 31 (operation S1). The controller 50 subsequently acquires a nonlinear effects monitor amount from the nonlinear effects monitor 40 (operation S2).

Next, the controller 50 estimates the direction of parameter control for decreasing the nonlinear effects monitor amount (operation S3). The controller 50 then controls parameters of the equalizer 31 so that the nonlinear effects monitor amount decreases (operation S4).

After that, the controller 50 determines whether an output of the nonlinear effects monitor 40 is less than a predetermined value μ (operation S5). If "No" in operation S5, the controller 50 again executes the operation S2 and the subsequent operations. If "Yes" in operation S5, the controller 50 terminates the execution of the control method. According to the control method of FIG. 5, the nonlinear effects monitor amount detected by the nonlinear effects monitor 40 can be controlled to a small value. Thus, nonlinear distortion can be compensated for.

Figure 6A:
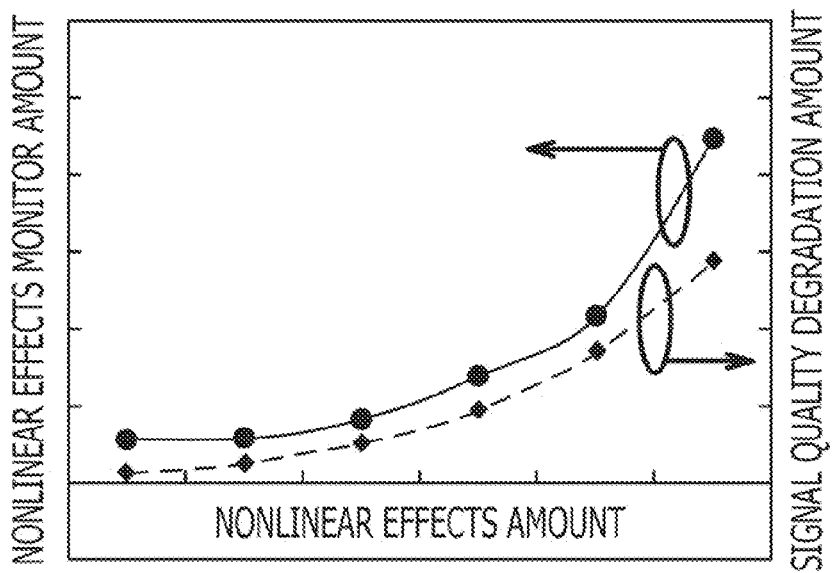
FIG. 6A illustrates a nonlinear effects monitor amount detected by a nonlinear effects monitor.
Figure 6B:
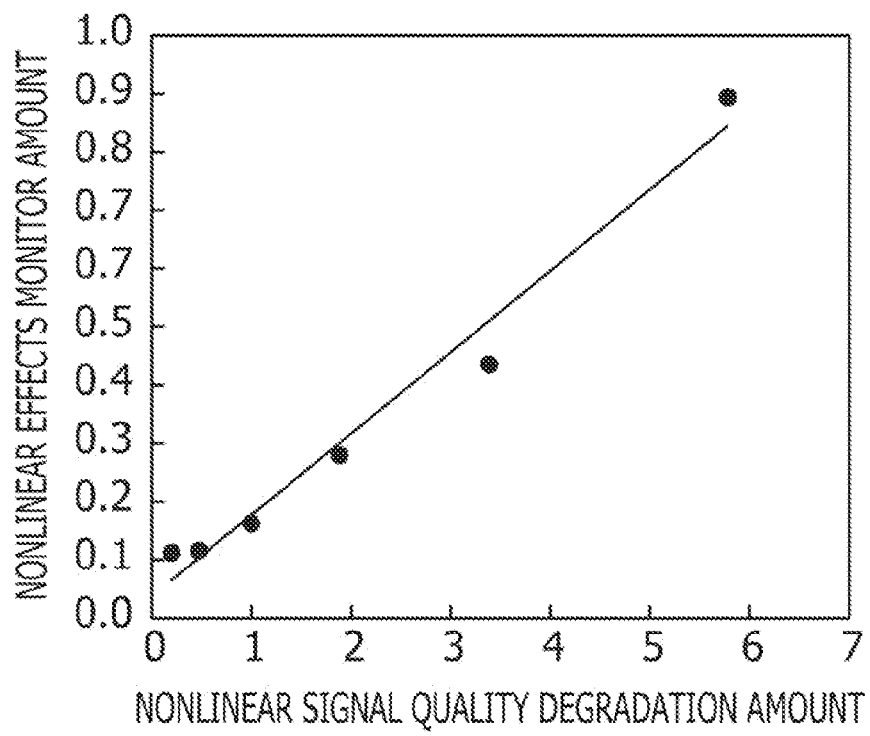
FIG. 6B illustrates a result of simulation demonstrating the relationship between the nonlinear effects monitor amount and an actual signal quality degradation amount.

FIGS. 6A and 6B illustrate a result of simulation demonstrating the relationship between the nonlinear effects monitor amount detected by the nonlinear effects monitor 40 and an actual amount of signal quality degradation (hereinafter, "signal quality degradation amount"). Referring to FIG. 6A, the axis of abscissas denotes an actual nonlinear effects amount, the left axis of ordinates denotes the nonlinear effects monitor amount detected by the nonlinear effects monitor 40, and the right axis of ordinates denotes the signal quality degradation amount. As illustrated in FIG. 6A, the nonlinear effects monitor amount and the signal quality degradation amount substantially correspond to each other relative to the actual nonlinear effects amount. In addition, as illustrated in FIG. 6B, the one-to-one correspondence between the nonlinear effects monitor amount and the signal quality degradation amount is held.

Figure 7A:
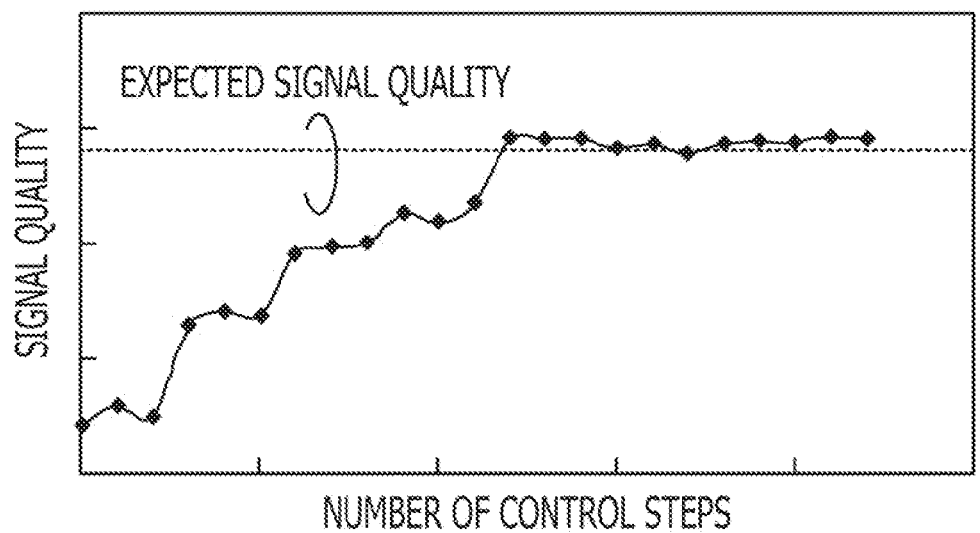
FIG. 7A illustrates a change in signal quality.
Figure 7B:
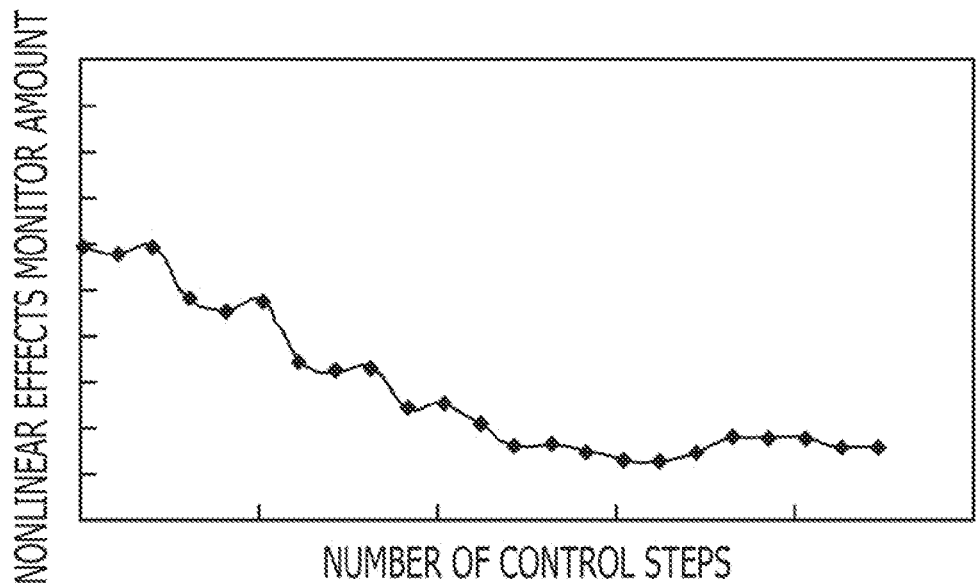
FIG. 7B illustrates a change in the result of detection by the nonlinear effects monitor.

FIGS. 7A and 7B illustrate a signal quality obtained when the controller 50 controls the equalizer 31 based on the result of detection by the nonlinear effects monitor 40. FIG. 7A illustrates a change in signal quality. FIG. 7B illustrates a change in the result of detection by the nonlinear effects monitor 40. The axis of abscissas in each of FIGS. 7A and 7B denotes elapsed time from the time when nonlinear distortion compensation by the controller 50 based on the result of detection by the nonlinear effects monitor 40 is started. The axis of ordinates in FIG. 7A denotes the signal quality and that in FIG. 7B denotes the nonlinear effects monitor amount.

It is found from FIGS. 7A and 7B that the signal quality is converged on an expected signal quality as the nonlinear effects monitor decreases over time. Accordingly, nonlinear distortion can be detected using the nonlinear effects monitor 40 according to the present embodiment. Nonlinear distortion can be compensated for based on the result of detection. Thus, the nonlinear distortion can be compensated for with high accuracy.

To increase a calculation speed of the nonlinear effects monitor 40, the main signal processor 30 may include a noise addition mechanism. When the error correction calculator 35 is separated into two stages, an error correction number may be extracted from a first-stage decoder or a second-stage decoder, or may be generated by combining both of error correction numbers. As for an example of the two-stage structure, the error correction calculator 35 may include a soft-decision forward error correction (FEC) device and a hard-decision FEC circuit.

Figure 8A:
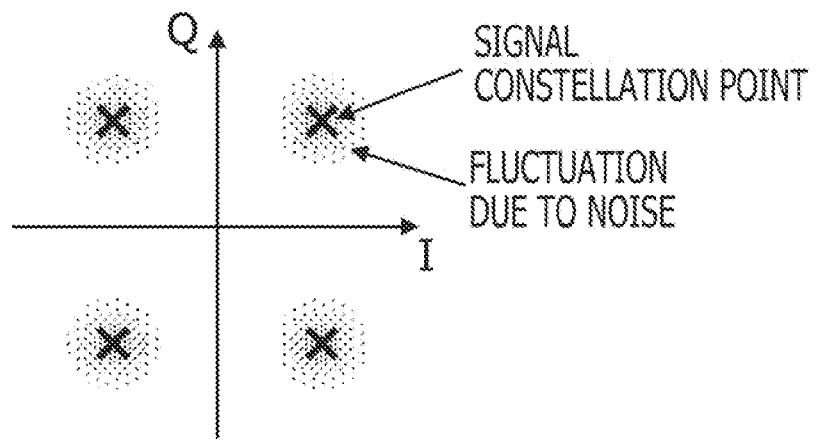
FIG. 8A illustrates the spread of a received signal in the vicinity of each signal constellation point.

In the present embodiment, a Q value is used as a signal quality index. The signal quality index is not limited to the Q value. For example, a received signal spread in the vicinity of each signal constellation point may be used. FIG. 8A illustrates received signal spreads in the vicinities of signal constellation points. Referring to FIG. 8A, the axis of abscissas indicates the I phase and the axis of ordinates indicates the Q phase. The signal constellation points have four phases ($\pi/4$, $3\pi/4$, $5\pi/4$, $7\pi/4$). The distribution of a received signal in the vicinity of each signal constellation point is expressed by the following expression based on Gaussian distribution.

$$p(x) = \frac{1}{\sigma\sqrt{2\pi}} \exp\left(\frac{-x^2}{2\sigma^2}\right) \quad (7)$$

Figure 8B:
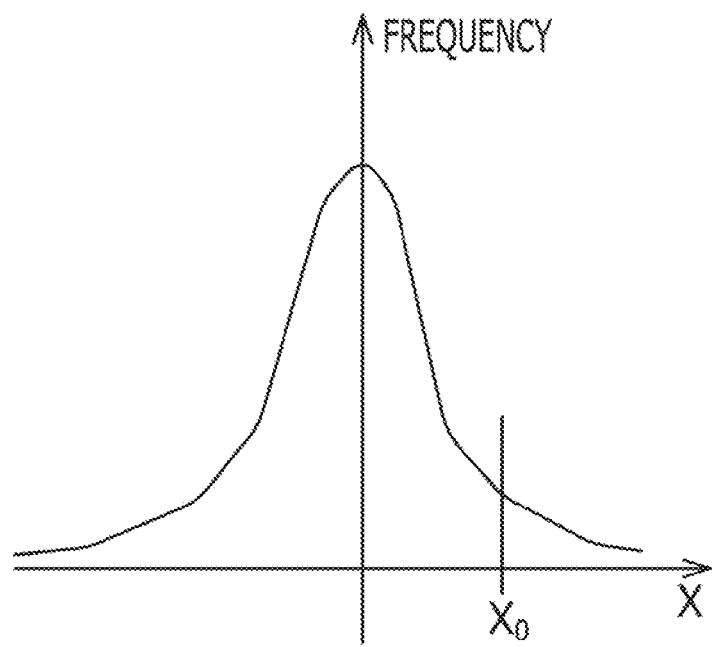
FIG. 8B illustrates a fluctuation X0.

As expressed in Expression (7), the parameter σ denotes an amount of fluctuation (signal quality) around each signal constellation point. As disclosed in Theodore S. Rappaport, "Wireless Communications-principles & Practice", Pearson Education, Inc, 1996, the probability that a fluctuation exceeds a value $X_0$ (Q value–signal quality) can be expressed by the following expressions. The fluctuation $X_0$ can be expressed as illustrated in FIG. 8B.

$$Q(z) = \int_z^\infty \frac{1}{\sqrt{2\pi}} \exp\left(\frac{-y^2}{2}\right) dy \quad (8)$$

$$y = x/\sigma \quad (9)$$

$$z = x_0/\sigma \quad (10)$$

When an optimum signal identification point Z is selected, a Q value is combined with a signal error rate (BER) based on the relation of $Q=\sqrt{2}\text{erfc}^{-1}(2\times\text{BER})$, as disclosed in Takaya Yamamoto, "Hikari Fiber Tsushin Gijutsu [Optical Fiber Communication Technology]", Nikkan Kyogo Shimbun, Ltd., 1995. Accordingly, a fluctuation around each signal constellation point, a Q value, and a signal error rate can be used as different indices substantially indicating the same.

Second Embodiment

FIG. 9A illustrates an optical receiver 103a according to a second embodiment. The optical receiver 103a is a polarization diversity optical receiver. Referring to FIG. 9A, the optical receiver 103a includes a coherent optical front-end 10a instead of the coherent optical front-end 10 as illustrated in FIG. 2A.

FIG. 9B illustrates the coherent optical front-end 10a. Referring to FIG. 9B, an optical signal is input to a polarization beam splitter 15. The polarization beam splitter 15 splits the optical signal into two optical signals in two polarization directions. A polarization beam splitter 16 splits an oscillation optical signal of the local optical oscillator 14 into two optical signals in two polarization directions. The 90° hybrids 12, the O/Es 13, and the ADCs 20 convert the polarized optical signals to I-phase and Q-phase digital electrical signals. The signals are input to the main signal processor 30.

In the optical receiver 103a, the nonlinear effects monitor 40 according to the first embodiment is provided for each polarization, so that a nonlinear effects monitor amount for each polarization can be acquired. Thus, nonlinear distortion can be compensated for with high accuracy.

Third Embodiment

Figure 10A:
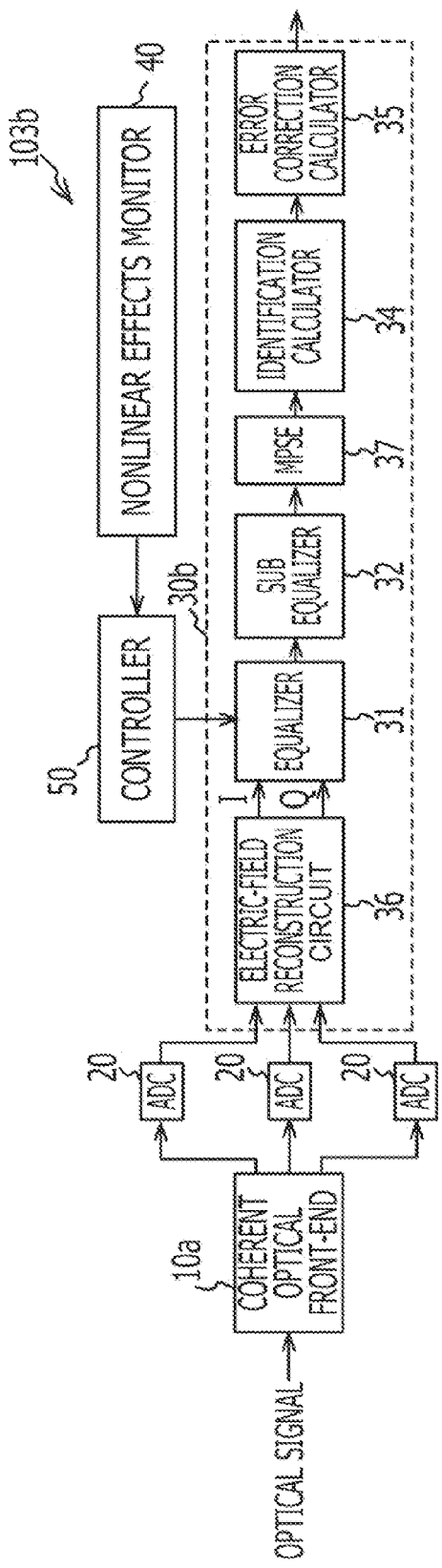
FIG. 10A illustrates an optical receiver according to a third embodiment.

FIG. 10A illustrates an optical receiver 103b according to a third embodiment. The optical receiver 103b is a self-coherent optical receiver. Referring to FIG. 10A, the optical receiver 103b includes a coherent optical front-end 10b instead of the coherent optical front-end 10 and includes a main signal processor 30b instead of the main signal processor 30 as illustrated in FIG. 2A.

Figure 10B:
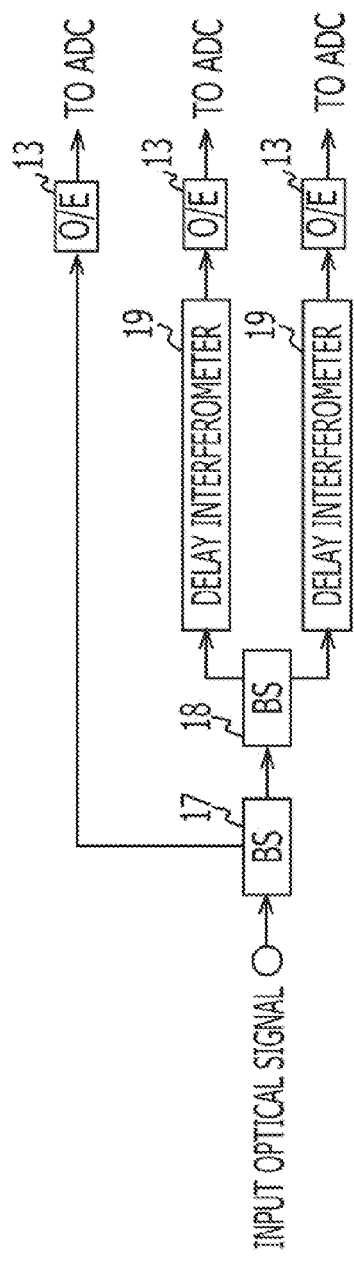
FIG. 10B illustrates a coherent optical front-end.

FIG. 10B illustrates the coherent optical front-end 10b. Referring to FIG. 10B, an optical signal input to the optical receiver 103b is split into two signals by a beam splitter 17. One of the split optical signals is further split by a beam splitter 18. Optical signals obtained by the beam splitter 18 are supplied to delay interferometers 19, respectively. One of the delay interferometers 19 allows the optical signal to cause self delay interference, thus extracting an I-phase signal included in the optical signal. For example, an input signal is split into two signals and one of the signals is delayed by one bit and is allowed to interfere with the other signal, so that an I-phase signal can be extracted. The other delay interferometer 19 allows the optical signal to cause self delay interference, thus extracting a Q-phase signal included in the optical signal. The optical signals output from the delay interferometers 19 are input to the O/Es 13.

The other split optical signal obtained through the beam splitter 17 is directly input to the O/E 13 without bypassing the delay interferometer 19. The functions of the O/Es 13 and the ADCs 20 may be the same as those in the first embodiment. Digital electrical signals output from the ADCs 20 are input to a main signal processor 30b.

The main signal processor 30b includes an electric-field reconstruction circuit 36 at the preceding stage of the equalizer 31 and includes a multi-symbol phase estimation (MPSE) circuit 37 instead of the carrier phase recovery circuit 33 as illustrated in FIG. 2A. The electric-field reconstruction circuit 36 performs a process of reconstructing a received complex optical electric field from received signal information and outputs the resultant signal as I-phase and Q-phase signals to the equalizer 31. Each of the equalizer 31 and the sub equalizer 32 compensates for distortion of the input electrical signal and outputs the resultant electrical signal to the MPSE circuit 37. The MPSE circuit 37 performs multi-symbol phase estimation on the input signal and outputs the resultant signal to the identification calculator 34.

In the present embodiment, a nonlinear effects monitor amount can be acquired using signals upstream and downstream of the identification calculator 34 and an error correction number in accordance with a method similar to the first embodiment. Thus, nonlinear distortion can be compensated for with high accuracy.

Fourth Embodiment

FIG. 11A illustrates an optical receiver 103c according to a fourth embodiment. The optical receiver 103c is a polarization diversity self-coherent optical receiver. Referring to FIG. 11A, the optical receiver 103c includes a coherent optical front-end 10c instead of the coherent optical front-end 10 and includes a main signal processor 30c instead of the main signal processor 30 as illustrated in FIG. 2A.

FIG. 11B illustrates the coherent optical front-end 10c. Referring to FIG. 11B, an optical signal input to the optical receiver 103c is split into two optical signals in two polarization directions by the polarization beam splitter 15. The split optical signals are processed through the delay interferometers 19, the O/Es 13, and the ADCs 20 according to the third embodiment and are then input to the main signal processor 30c.

The main signal processor 30c includes two electric-field reconstruction circuits 36 at the preceding stage of the equalizer 31 and includes the MPSE circuit 37 instead of the carrier phase recovery circuit 33 as illustrated in FIG. 2A. Digital electrical signals corresponding to the two split optical signals in the two polarization directions are input to the electric-field reconstruction circuits 36, respectively.

Each electric-field reconstruction circuit 36 performs a process of reconstructing a complex optical electric field in a manner substantially similar to the third embodiment and outputs the resultant signal to the equalizer 31. The other functions and components in the fourth embodiment may be the same as those in the third embodiment.

In the present embodiment, a nonlinear effects monitor amount can be acquired using signals upstream and downstream of the identification calculator 34 and an error correction number in accordance with a method similar to the first embodiment. Thus, nonlinear distortion can be compensated for with high accuracy.

While the embodiments have been described in detail, it should be understood that the present invention is not limited to any specific embodiment and various changes and modifications of the embodiments may be made within the scope and spirit of the present invention defined in the appended claims.

The nonlinear distortion detecting module, the optical receiver, the optical transmission system, and the method for detecting nonlinear distortion disclosed in this specification can detect nonlinear distortion that that can be used for nonlinear distortion compensation.

The invention claimed is:

1. A module comprising:
a first estimator that estimates a first signal quality based on a number of error corrections of an electrical signal obtained by photoelectrically converting a received optical signal;
a second estimator that estimates a second signal quality from which an influence of nonlinear effects is removed based on signals upstream and downstream of an identification calculator identifying the electrical signal; and
a calculator that calculates a difference between the first and second signal qualities estimated by the first and second estimators to calculate an amount of nonlinear effects,
wherein the second estimator estimates the second signal quality, from which the influence of nonlinear effects is removed, using a signal from which a noise component having no correlation between symbols is removed by averaging on a plurality of symbols.

2. The module according to claim 1, wherein the second estimator obtains, as a first average, an average of squares of signals obtained by subtracting a signal downstream of the identification calculator from a signal upstream thereof, obtains, as a second average, an average of products of signals, each obtained by subtracting a signal downstream of the identification calculator from a signal upstream thereof, of adjacent symbols, and subtracts the second average from the first average to estimate the signal quality from which the influence of nonlinear effects is removed.

3. The module according to claim 1, wherein the first and second estimators each uses a Q value as the signal quality.

4. An optical receiver comprising:
a first estimator that estimates a first signal quality based on a number of error corrections of an electrical signal obtained by photoelectrically converting a received optical signal;
a second estimator that estimates a second signal quality from which an influence of nonlinear effects is removed based on signals upstream and downstream of an identification calculator identifying the electrical signal;
a calculator that calculates a difference between the first and second signal qualities estimated by the first and second estimators to calculate an amount of nonlinear effects; and
a controller that controls an equalizer based on the difference output by the calculator so that nonlinear distortion detected by the module decreases, wherein the second estimator estimates the second signal quality, from which the influence of nonlinear effects is removed, using a signal from which a noise component having no correlation between symbols is removed by averaging on a plurality of symbols.

5. An optical transmission system comprising:
a first estimator that estimates a first signal quality based on a number of error corrections of an electrical signal obtained by photoelectrically converting a received optical signal;
a second estimator that estimates a second signal quality from which an influence of nonlinear effects is removed based on signals upstream and downstream of an identification calculator identifying the electrical signal; and
a calculator that calculates a difference between the first and second signal qualities estimated by the first and second estimators to calculate an amount of nonlinear effects;
a controller that controls an equalizer based on the difference output by the calculator so that nonlinear distortion detected by the module decreases; and
an optical transmitter that transmits a signal to the optical receiver through an optical transmission path,
wherein the second estimator estimates the second signal quality, from which the influence of nonlinear effects is removed, using a signal from which a noise component having no correlation between symbols is removed by averaging on a plurality of symbols.

6. A method for detecting nonlinear effects, the method comprising:
estimating a first signal quality based on the number of error corrections of an electrical signal obtained by photoelectrically converting an optical signal received through an optical transmission path;
estimating a second signal quality, from which the influence of nonlinear effects is removed, based on signals upstream and downstream of an identification calculator identifying the electrical signal; and
obtaining a difference between the first and second signal qualities to calculate an amount of nonlinear effects, wherein in the estimating the second signal quality, the second signal quality is estimated using a signal from which a noise component having no correlation between symbols is removed by averaging on a plurality of symbols.

7. The method according to claim 6, wherein the estimating the second signal quality includes a sub-operation of obtaining, as a first average, a squares average of signals obtained by subtracting a signal downstream of the identification calculator from a signal upstream thereof, a sub-operation of obtaining, as a second average, a products average of signals, obtained by subtracting a signal downstream of the identification calculator from a signal upstream thereof, of adjacent symbols, and a sub-operation of subtracting the second average from the first average to estimate the signal quality from which the influence of nonlinear effects is removed.

8. The method according to claim 6, wherein in each of the estimating the first signal quality and the second signal quality, a Q value is used as the signal quality.

* * * * *